(12) United States Patent
Bae et al.

(10) Patent No.: US 8,838,349 B2
(45) Date of Patent: Sep. 16, 2014

(54) DRIVE CONTROL SYSTEM FOR CONSTRUCTION MACHINERY

(75) Inventors: Sang-Ki Bae, Changwon-si (KR); Jae-Hoon Lee, Changwon-si (KR); Sung-Yong Jo, Changwon-si (KR)

(73) Assignee: Volvo Construction Equipment AB (SE)

( * ) Notice: Subject to any disclaimer, the term of this patent is extended or adjusted under 35 U.S.C. 154(b) by 0 days.

(21) Appl. No.: 13/997,938

(22) PCT Filed: Dec. 27, 2010

(86) PCT No.: PCT/KR2010/009360
§ 371 (c)(1),
(2), (4) Date: Jun. 25, 2013

(87) PCT Pub. No.: WO2012/091186
PCT Pub. Date: Jul. 5, 2012

(65) Prior Publication Data
US 2013/0289835 A1    Oct. 31, 2013

(51) Int. Cl.
G06F 7/70        (2006.01)
E02F 9/22        (2006.01)
G06F 17/00       (2006.01)
F15B 11/17       (2006.01)

(52) U.S. Cl.
CPC ............. *G06F 17/00* (2013.01); *E02F 9/2292* (2013.01); *F15B 2211/6658* (2013.01); *F15B 2211/665* (2013.01); *F15B 2211/7142* (2013.01); *F01B 2211/763* (2013.01); *F15B 2211/20576* (2013.01); *F15B 2211/7058* (2013.01); *F15B 2211/20546* (2013.01); *E02F 9/2253* (2013.01); *F15B 11/17* (2013.01); *E02F 9/2296* (2013.01); *F15B 2211/7135* (2013.01)
USPC .......................................................... 701/50

(58) Field of Classification Search
None
See application file for complete search history.

(56) References Cited

U.S. PATENT DOCUMENTS

| 2002/0028729 | A1* | 3/2002 | Kobayashi et al. ........... 477/174 |
| 2005/0120873 | A1* | 6/2005 | Gray .............................. 91/418 |
| 2009/0248259 | A1  | 10/2009 | Lee |
| 2013/0068183 | A1* | 3/2013 | Takada ....................... 123/90.17 |

FOREIGN PATENT DOCUMENTS

| KR | 10-1996-0004409 B1 | 4/1996 |
| KR | 10-2007-0068598 A  | 7/2007 |
| KR | 10-2009-0103082 A  | 10/2009 |

OTHER PUBLICATIONS

International Search Report (in Korean and English) and Written Opinion (in Korean) for PCT/KR2010/009360, mailed Sep. 29, 2011; ISA/KR.
International Preliminary Report on Patentability (Chapter II) (in Korean) for PCT/KR2010/009360, dated Apr. 19, 2013; IPEA/KR.

* cited by examiner

*Primary Examiner* — Thomas Tarcza
*Assistant Examiner* — Adam Alharbi
(74) *Attorney, Agent, or Firm* — Harness, Dickey & Pierce, P.L.C.

(57) ABSTRACT

A drive control system for preventing a sudden slowdown of driving speed to reduce the shock felt by a driver, when compound-operating two-way driving and a work device in an excavator.

12 Claims, 2 Drawing Sheets

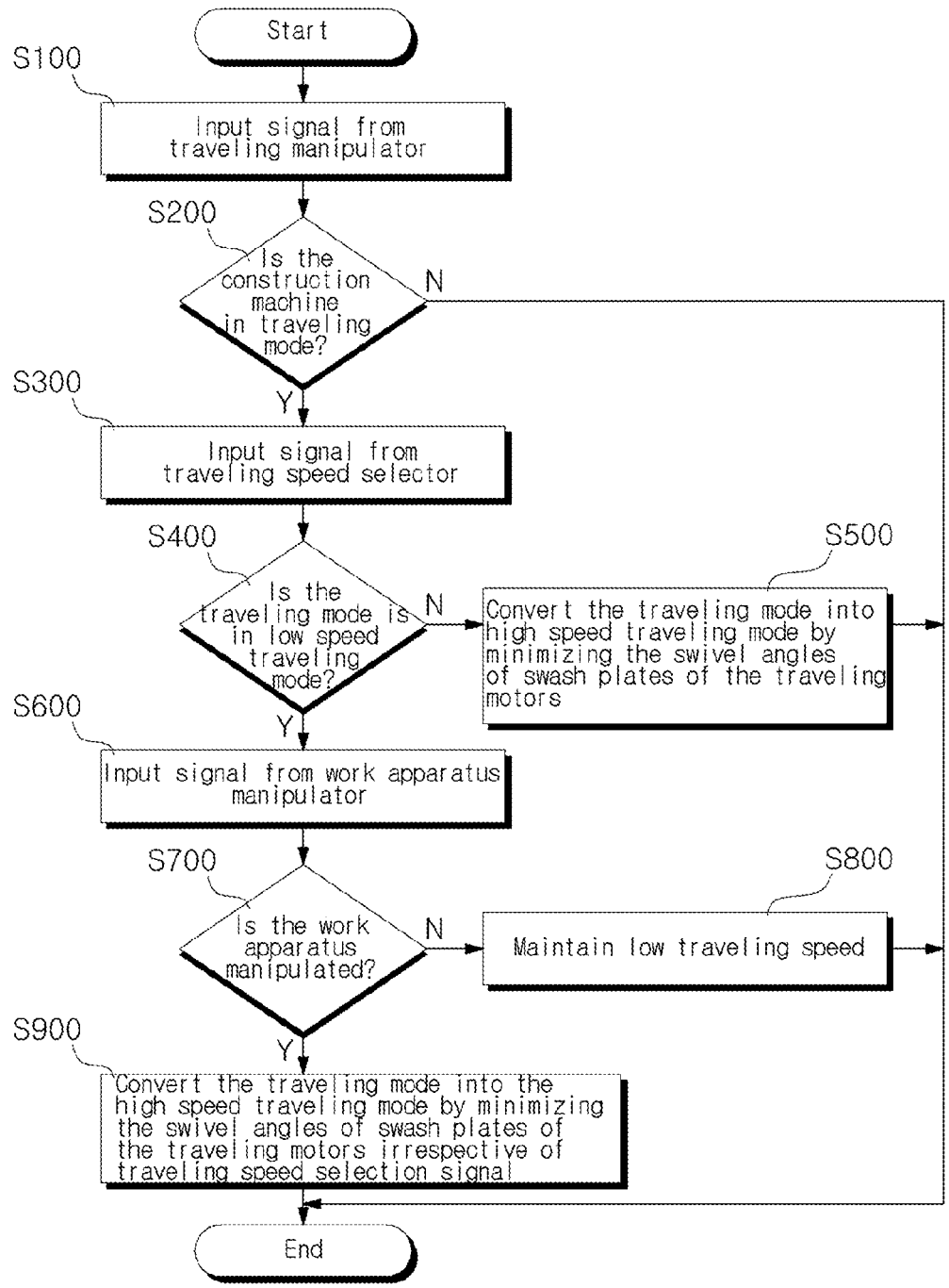

DRIVE CONTROL SYSTEM FOR CONSTRUCTION MACHINERY

CROSS-REFERENCE TO RELATED APPLICATIONS

Figure 1:
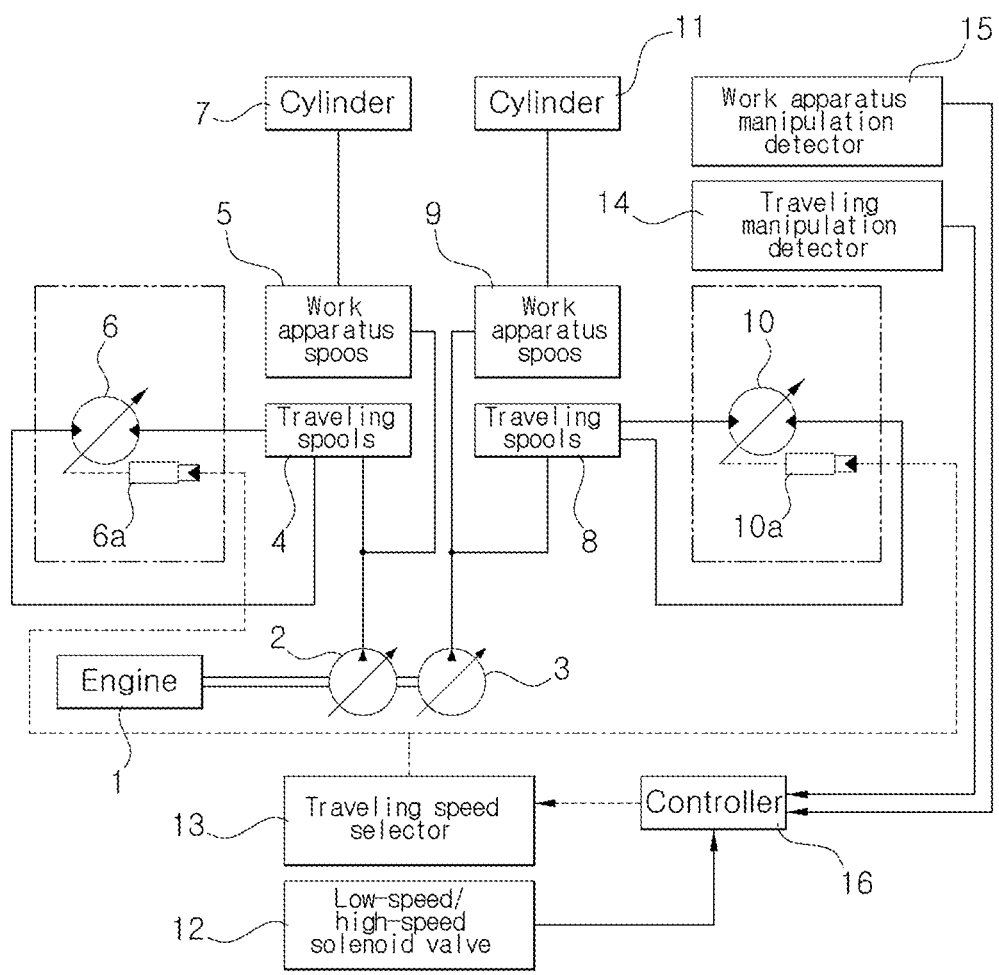

This is a U.S. National Stage Application of International Application No. PCT/KR2010/009360, filed on Dec. 27, 2010 and published in Korean as WO 2012/091186 A1 on Jul. 5, 2012. The disclosure of the above application is incorporated herein by reference.

FIELD OF THE INVENTION

The present invention relates to a traveling control system of a construction machine such as an excavator. More particularly, the present invention relates to a traveling control system of a wheel-type construction machine in which sudden slowdown of the traveling speed can be prevented to reduce a shock felt by the operator in case of a combined operation in which the two-way traveling operation and the operation of the work apparatus are performed.

BACKGROUND OF THE INVENTION

A hydraulic system applied to an excavator supplies some of a hydraulic fluid discharged from a plurality of variable displacement hydraulic pumps to left and right traveling motors through the shift of traveling spools, and supplies the remaining hydraulic fluid to a boom cylinder through the shift of work apparatus spools to drive a work apparatus such as a boom.

In the case where a low traveling speed is selected by an operator, a low-speed traveling selection signal is applied to a controller to cause the traveling mode of a solenoid valve to be converted into a low speed traveling mode in response to a control signal from the controller. Thus, a signal pressure passing through the solenoid valve is supplied to a speed conversion valve mounted in the traveling motor to drive the speed conversion valve so that the swivel angle of a swash plate of the traveling motor can be maximized to perform a low-speed traveling mode.

In a state in which the low-speed traveling mode is selected, when the two-way traveling operation is performed, the hydraulic fluid discharged from the hydraulic pump is respectively supplied to the left-traveling motor and the right-traveling motor via the traveling spools.

In this case, when the work apparatus is manipulated by the operator (i.e., a combined operation of the two-way traveling operation and the operation of the work apparatus is operation), some of the hydraulic fluid discharged from the hydraulic pumps is supplied to the traveling motors and the remaining hydraulic fluid is supplied to the boom cylinder to drive the work apparatus, and thus the traveling speed is suddenly reduced. For this reason, the operator feels a shock, thereby lowering manipulability and thus degrading workability.

DETAILED DESCRIPTION OF THE INVENTION

Technical Problems

Accordingly, the present invention was made to solve the aforementioned problem occurring in the prior art, and it is an object of the present invention to provide a traveling control system for a construction machine, in which in the case where a combined operation is performed by manipulating the work apparatus during a low speed traveling operation of an excavator, the traveling mode is automatically converted into a high-speed traveling mode irrespective of a traveling speed selection signal so that sudden slowdown of the traveling speed can be prevented to reduce a shock felt by the operator and improve manipulability.

Technical Solution

To accomplish the above object, in accordance with an embodiment of the present invention, there is provided a traveling control system for a construction machine, including:

first and second variable displacement hydraulic pumps connected to an engine;

a variable displacement left-traveling motor and a first hydraulic cylinder for a work apparatus that are connected to the first hydraulic pump and respectively driven when their spools are shifted;

a variable displacement right-traveling motor and a second hydraulic cylinder for the work apparatus that are connected to the second hydraulic pump and respectively driven when their spools are shifted;

a traveling speed selector configured to select either a low traveling speed or a high traveling speed;

a low-speed/high-speed switching solenoid valve configured to output a signal pressure to control the swivel angles of swash plates of the left and right traveling motors in response to a selection signal outputted from the traveling speed selector;

left and right traveling spools configured to control a start, a stop, and a direction change of the left and right traveling motors;

a left and right traveling manipulator configured to shift the left and right traveling spools;

first and second work apparatus spools configured to control a start, a stop and a direction change of the first and second hydraulic cylinders;

a first and second work apparatus manipulator configured to shift the first and second work apparatus spools; and a controller configured to determine whether or not the a left and right traveling manipulator and the a first and second work apparatus manipulator are manipulated in case of a combined operation in which the two-way traveling operation and the operation of the work apparatus are performed in a low speed traveling mode and output a high speed traveling control signal to the solenoid valve to minimize the swivel angles of the swash plates of the left and right traveling motors.

In accordance with an embodiment of the present invention, there is provided a traveling control system for a construction machine, wherein the traveling control system includes: first and second hydraulic pumps connected to an engine; left and right traveling motors and first and second hydraulic cylinder respectively connected to the first and second hydraulic pumps; a traveling speed selector configured to select either a low traveling speed or a high traveling speed; a low-speed/high-speed switching solenoid valve configured to output a signal pressure to control the swivel angles of swash plates of the left and right traveling motors; left and right traveling spools configured to control a start, a stop, and a direction change of the left and right traveling motors; a left and right traveling manipulator configured to shift the left and right traveling spools; first and second work apparatus spools configured to control a start, a stop and a direction change of the first and second hydraulic cylinders; a first and second work apparatus manipulator configured to shift the first and second work apparatus spools; and a controller configured to determine whether or not the a left and right traveling manipulator and the a first and second work apparatus manipulator are manipulated and output a control signal for controlling the swivel angles of the swash plates of the left and right traveling motors, the traveling control system including:

a first step of determining whether or not a two-way traveling operation is performed by detecting manipulation of the traveling manipulator;

a second step of determining whether or not a low speed traveling mode is selected in response to a selection signal outputted from the traveling speed selector 12;

a third step of determining whether or not the operation of the work apparatuses is performed by detecting manipulation of the work apparatus manipulator in the low speed traveling mode; and a fourth step of determining whether or not the two-way traveling manipulator and the a first and second work apparatus manipulator are manipulated at the same time in case of a combined operation in which the two-way traveling operation and the operation of the work apparatus are performed in the low speed traveling mode, and converting the traveling mode into a high speed traveling mode by minimizing the swivel angle of the swash plates of the left and right traveling motors.

In accordance with a more preferable embodiment, the traveling manipulator may output an electric output value according to the manipulation.

The traveling manipulator may output a hydraulic pressure value according to the manipulation.

The first and second work apparatus manipulator may output an electric output value according to the manipulation.

The first and second work apparatus manipulator may output a hydraulic pressure value according to the manipulation.

The electric output values of the traveling manipulator and the first and second work apparatus manipulator may be inputted to the controller so that the controller determines whether or not the traveling manipulator and the work apparatus manipulator are manipulated, and a plurality of electronic proportional valves for converting the electric output values into hydraulic pressures for shifting the left and right traveling spools and the first and second work apparatus spools are mounted between the controller and each of the spools.

Whether or not the traveling manipulator and the first and second work apparatus manipulator are manipulated may be detected by a plurality of pressure sensor, which in turn outputs an electric output value for application to the controller.

Advantageous Effect

The traveling control system for a construction machine in accordance with an embodiment of the present invention as constructed above has the following advantages.

In the case where a combined operation is performed by manipulating the work apparatus during a low speed traveling operation of an excavator, the traveling mode is automatically converted into a high-speed traveling mode irrespective of a traveling speed selection signal so that sudden slowdown of the traveling speed can be prevented to reduce a shock felt by the operator and improve manipulability and workability.

BRIEF DESCRIPTION OF THE INVENTION

The above objects, other features and advantages of the present invention will become more apparent by describing the preferred embodiments thereof with reference to the accompanying drawings, in which:

FIG. 1 is a hydraulic circuit diagram showing a traveling control system for a construction machine in accordance with an embodiment of the present invention; and FIG. 2 is a flowchart showing the operation of a traveling control system for a construction machine in accordance with an embodiment of the present invention.

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

A traveling control system for a construction machine in accordance with an embodiment of the present invention as shown in FIG. 1 includes:

first and second variable displacement hydraulic pumps 2 and 3 (hereinafter, referred to as "first and second hydraulic pumps") connected to an engine 1;

a variable displacement left-traveling motor (hereinafter, referred to as "left-traveling motor") 6 and a first hydraulic cylinder 7 for a work apparatus that are connected to the first hydraulic pump 2 and respectively driven when a left traveling spool 4 and a first work apparatus spool 5 are shifted;

a variable displacement right-traveling motor (hereinafter, referred to as "right-traveling motor") 10 and a second hydraulic cylinder 11 for the work apparatus that are connected to the second hydraulic pump 3 and respectively driven when a right traveling spool 8 and a second work apparatus spool 9 are shifted;

a traveling speed selector 12 configured to select either a low traveling speed or a high traveling speed;

a low-speed/high-speed switching solenoid valve 13 configured to output a signal pressure to control the swivel angles of swash plates of the left and right traveling motors 6 and 10 in response to a selection signal outputted from the traveling speed selector 12;

left and right traveling spools 4 and 8 configured to control a start, a stop, and a direction change of the left and right traveling motors 6 and 10;

a left and right traveling manipulator (not shown) configured to shift the left and right traveling spools 4 and 8;

first and second work apparatus spools 5 and 9 configured to control a start, a stop and a direction change of the first and second hydraulic cylinders 7 and 11;

a first and second work apparatus manipulator (not shown) configured to shift the first and second work apparatus spools 5 and 9; and a controller 16 configured to determine whether or not the a left and right traveling manipulator and the a first and second work apparatus manipulator are manipulated in case of a combined operation in which the two-way traveling operation and the operation of the work apparatus are performed in a low speed traveling mode and output a high speed traveling control signal to the low-speed/high-speed switching solenoid valve 13 to minimize the swivel angles of the swash plates of the left and right traveling motors 6 and 10.

In this case, the traveling manipulator (not shown) outputs an electric output value according to the manipulation.

The traveling manipulator outputs a hydraulic pressure value according to the manipulation.

The first and second work apparatus manipulator (not shown) outputs an electric output value according to the manipulation.

The first and second work apparatus manipulator outputs a hydraulic pressure value according to the manipulation.

The electric output values of the traveling manipulator and the first and second work apparatus manipulator are inputted to the controller 16 so that the controller determines whether or not the traveling manipulator and the work apparatus manipulator are manipulated, and a plurality of electronic proportional valves (not shown) for converting the electric output values into hydraulic pressures for shifting the left and right traveling spools 4 and 8 and the first and second work apparatus spools 5 and 9 are mounted between the controller 16 and each of the spools.

Whether or not the traveling manipulator and the first and second work apparatus manipulator are manipulated is detected by a plurality of pressure sensors (not shown), which in turn outputs an electric output value for application to the controller 16.

In accordance with an embodiment of the present invention as shown in FIG. 2, there is provided a traveling control method using a traveling control system for a construction machine, the traveling control system including: first and second variable displacement hydraulic pumps 2 and 3 connected to an engine 1; left and right variable displacement traveling motors 6 and 10 and first and second hydraulic cylinder 7 and 11 respectively connected to the first and second hydraulic pumps 2 and 3; a traveling speed selector 12 configured to select either a low traveling speed or a high traveling speed; a low-speed/high-speed switching solenoid valve 13 configured to output a signal pressure to control the swivel angles of swash plates of the left and right traveling motors 6 and 10; left and right traveling spools 4 and 8 configured to control a start, a stop, and a direction change of the left and right traveling motors 6 and 10; a left and right traveling manipulator 14 (not shown) configured to shift the left and right traveling spools 4 and 8; first and second work apparatus spools 5 and 9 configured to control a start, a stop and a direction change of the first and second hydraulic cylinders; a first and second work apparatus manipulator (not shown) configured to shift the first and second work apparatus spools 5 and 9; and a controller 16 configured to determine whether or not the a left and right traveling manipulator and the a first and second work apparatus manipulator are manipulated and output a control signal for controlling the swivel angles of the swash plates of the left and right traveling motors 6 and 10.

The traveling control method includes:

a first step (S100 and S200) of determining whether or not a two-way traveling operation is performed by detecting manipulation of the traveling manipulator;

a second step (S300, S400, S500) of determining whether or not a low speed traveling mode is selected in response to a selection signal outputted from the traveling speed selector 12;

a third step (S600, S700, S800) of determining whether or not the operation of the work apparatuses is performed by detecting manipulation of the a first and second work apparatus manipulator in the low speed traveling mode; and a fourth step (S900) of determining whether or not the two-way traveling manipulator and the a first and second work apparatus manipulator are manipulated at the same time in case of a combined operation in which the two-way traveling operation and the operation of the work apparatus are performed in the low speed traveling mode, and converting the traveling mode into a high speed traveling mode by minimizing the swivel angle of the swash plates of the left and right traveling motors 6 and 10.

Hereinafter, a use example of the traveling control system for a construction machine in accordance with an embodiment of the present invention will be described in detail with reference to FIGS. 1 and 2.

At step S100, when a travel manipulator (not shown) is manipulated by an operator, the manipulation of the traveling manipulator is detected by a traveling manipulation detector 14, which in turn generates a manipulation signal for application to the controller 16.

In the case where the traveling manipulator is a hydraulic manipulator, the traveling manipulation detector 14 detects a hydraulic pressure such as a pressure sensor or a pressure switch and converts the detected hydraulic pressure into an electric signal for application to the controller 16. In the case where the traveling manipulator is an electric manipulator, the electric manipulator detects outputs an electric signal for application to the controller 16 without a separate detector.

At step S200, the controller 16 determines whether or not the construction machine is in a traveling mode based on the manipulation signal inputted to the controller 16. If it is determined at step S200 that the construction machine is in the traveling mode, the program proceeds to step S300 where the controller 16. On the contrary, if it is determined at step S200 that the construction machine is not in the traveling mode, the program is terminated.

At step S300, if the construction machine is in the traveling mode, the operator manipulates the traveling speed selector 12 to select either a low traveling speed or high traveling speed, and a selection signal outputted from the traveling speed selector 12 is applied to the controller 16.

At step S400, the controller 16 determines whether or not the traveling mode is in a low speed traveling mode based on the selection signal applied to the controller 16. If it is determined at step S400 that the traveling mode is in the low speed traveling mode, the program proceeds to step S600. On the contrary, if it is determined at step 4200 that the traveling mode is not in the low speed traveling mode, the program proceeds to step S500.

At step 5, in the case where a high speed traveling mode is selected by the manipulation of the traveling speed selector 12, the traveling mode is converted into the high speed traveling mode by minimizing the swivel angles of swash plates of the left and right traveling motors 6 and 10.

At step S600, when the first and second work apparatus manipulator (not shown) is manipulated by the operator, the manipulation of the work apparatus manipulator is detected by a work apparatus manipulation detector 15, which in turn generates a manipulation signal for application to the controller 16.

In the case where the first and second work apparatus manipulator is a hydraulic manipulator, the work apparatus manipulation detector 15 detects a hydraulic pressure such as a pressure sensor or a pressure switch and converts the detected hydraulic pressure into an electric signal for application to the controller 16. In the case where the work apparatus manipulator is an electric manipulator, the electric manipulator detects outputs an electric signal for application to the controller 16 without a separate detector At step S700, the controller 16 determines whether or not a work apparatus such as a boom is manipulated based on a detection signal from the work apparatus manipulation detector 15 in a state in which the low speed traveling mode is selected. If it is determined at S700 that the work apparatus is manipulated, the program proceeds to step S900. On the contrary, if it is determined at S700 that the work apparatus is in a stop state based on the detection signal from the work apparatus manipulation detector 15, the program proceeds to step S800 where the low speed traveling mode is maintained.

At step S900, the controller 16 calculates a low-speed traveling election signal applied thereto from the traveling speed selector 12, a traveling manipulation signal applied thereto from the traveling manipulation detector 14, and a work apparatus manipulation signal applied thereto from the work apparatus manipulation detector 15 in case of a combined operation in which the two-way traveling operation and the operation of the work apparatus are performed in the low speed traveling mode.

For this reason, the controller 16 outputs a control signal to the low-speed/high-speed switching solenoid valve 13 to control the left and right traveling motors 6 and 10. Thus, the traveling mode can be converted into the high speed traveling mode by minimizing the swivel angles of swash plates of the left and right traveling motors 6 and 10 by means of speed conversion valves 6a and 10a mounted in the left and right traveling motors 6 and 10.

As a result, the hydraulic fluid discharged from the first and second hydraulic pumps 2 and 3 is distributedly supplied to the left and right traveling motors 6 and 10 and the hydraulic cylinders 7 and 11. In this case, as the traveling mode is converted into the high speed traveling mode by minimizing the swivel angles of swash plates of the left and right traveling motors 6 and 10, so that sudden slowdown of the traveling speed can be prevented to reduce a shock felt by the operator in case of a combined operation in which the two-way traveling operation and the operation of the work apparatus are performed, While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the abovementioned embodiments but should be defined by the appended claims and equivalents thereof.

INDUSTRIAL APPLICABILITY

As described above, according to the traveling control system for a construction machine in accordance with an embodiment of the present invention, In the case where a combined operation is performed by manipulating the work apparatus during a low speed traveling operation of an excavator, the traveling mode is automatically converted into a high-speed traveling mode irrespective of a traveling speed selection signal so that sudden slowdown of the traveling speed can be prevented to reduce a shock felt by the operator and improve manipulability.

The invention claimed is:

1. A traveling control system for a construction machine comprising:
    first and second variable displacement hydraulic pumps connected to an engine;
    a variable displacement left-traveling motor and a first hydraulic cylinder for a work apparatus that are connected to the first hydraulic pump and respectively driven when their spools are shifted;
    a variable displacement right-traveling motor and a second hydraulic cylinder for the work apparatus that are connected to the second hydraulic pump and respectively driven when their spools are shifted;
    a traveling speed selector configured to select either a low traveling speed or a high traveling speed;
    a low-speed/high-speed switching solenoid valve configured to output a signal pressure to control the swivel angles of swash plates of the left and right traveling motors in response to a selection signal outputted from the traveling speed selector;
    left and right traveling spools configured to control a start, a stop, and a direction change of the left and right traveling motors;
    a left and right traveling manipulator configured to shift the left and right traveling spools;
    first and second work apparatus spools configured to control a start, a stop and a direction change of the first and second hydraulic cylinders;
    a first and second work apparatus manipulator configured to shift the first and second work apparatus spools; and
    a controller configured to determine whether or not the a left and right traveling manipulator and the a first and second work apparatus manipulator are manipulated in case of a combined operation in which the two-way traveling operation and the operation of the work apparatus are performed in a low speed traveling mode and output a high speed traveling control signal to the solenoid valve to minimize the swivel angles of the swash plates of the left and right traveling motors.

2. A traveling control system for a construction machine, which includes: first and second hydraulic pumps connected to an engine; left and right traveling motors and first and second hydraulic cylinder respectively connected to the first and second hydraulic pumps; a traveling speed selector configured to select either a low traveling speed or a high traveling speed; a low-speed/high-speed switching solenoid valve configured to output a signal pressure to control the swivel angles of swash plates of the left and right traveling motors; left and right traveling spools configured to control a start, a stop, and a direction change of the left and right traveling motors; a left and right traveling manipulator configured to shift the left and right traveling spools; first and second work apparatus spools configured to control a start, a stop and a direction change of the first and second hydraulic cylinders; a first and second work apparatus manipulator configured to shift the first and second work apparatus spools; and a controller configured to determine whether or not the a left and right traveling manipulator and the a first and second work apparatus manipulator are manipulated and output a control signal for controlling the swivel angles of the swash plates of the left and right traveling motors, the traveling control system comprising:
    a first step of determining whether or not a two-way traveling operation is performed by detecting manipulation of the traveling manipulator;
    a second step of determining whether or not a low speed traveling mode is selected in response to a selection signal outputted from the traveling speed selector;
    a third step of determining whether or not the operation of the work apparatuses is performed by detecting manipulation of the work apparatus manipulator in the low speed traveling mode; and
    a fourth step of determining whether or not the two-way traveling manipulator and the a first and second work apparatus manipulator are manipulated at the same time in case of a combined operation in which the two-way traveling operation and the operation of the work apparatus are performed in the low speed traveling mode, and converting the traveling mode into a high speed traveling mode by minimizing the swivel angle of the swash plates of the left and right traveling motors.

3. The traveling control system according to claim 1, wherein the traveling manipulator outputs an electric output value according to the manipulation.

4. The traveling control system according to claim 1, wherein the traveling manipulator outputs a hydraulic pressure value according to the manipulation.

5. The traveling control system according to claim 1, wherein the first and second work apparatus manipulator outputs an electric output value according to the manipulation.

6. The traveling control system according to claim 1, wherein the first and second work apparatus manipulator outputs a hydraulic pressure value according to the manipulation.

7. The traveling control system according to claim 3, wherein the electric output values of the traveling manipulator and the first and second work apparatus manipulator are inputted to the controller so that the controller determines whether or not the traveling manipulator and the work apparatus manipulator are manipulated, and a plurality of electronic proportional valves for converting the electric output values into hydraulic pressures for shifting the left and right traveling spools and the first and second work apparatus spools are mounted between the controller and each of the spools.

8. The traveling control system according to claim 4, wherein whether or not the traveling manipulator and the first and second work apparatus manipulator are manipulated is detected by a plurality of pressure sensors, which in turn outputs an electric output value for application to the controller.

9. The traveling control system according to claim 4, wherein the electric output values of the traveling manipulator and the first and second work apparatus manipulator are inputted to the controller so that the controller determines whether or not the traveling manipulator and the work apparatus manipulator are manipulated, and a plurality of electronic proportional valves for converting the electric output values into hydraulic pressures for shifting the left and right traveling spools and the first and second work apparatus spools are mounted between the controller and each of the spools.

10. The traveling control system according to claim 5, wherein the electric output values of the traveling manipulator and the first and second work apparatus manipulator are inputted to the controller so that the controller determines whether or not the traveling manipulator and the work apparatus manipulator are manipulated, and a plurality of electronic proportional valves for converting the electric output values into hydraulic pressures for shifting the left and right traveling spools and the first and second work apparatus spools are mounted between the controller and each of the spools.

11. The traveling control system according to claim 5, wherein whether or not the traveling manipulator and the first and second work apparatus manipulator are manipulated is detected by a plurality of pressure sensors, which in turn outputs an electric output value for application to the controller.

12. The traveling control system according to claim 6, wherein whether or not the traveling manipulator and the first and second work apparatus manipulator are manipulated is detected by a plurality of pressure sensors, which in turn outputs an electric output value for application to the controller.

* * * * *